US008810195B2

(12) United States Patent
Mochida et al.

(10) Patent No.: US 8,810,195 B2
(45) Date of Patent: Aug. 19, 2014

(54) ELECTRONIC DEVICE, BATTERY CHARGER, AND ELECTRONIC DEVICE BATTERY-CHARGING SYSTEM

(75) Inventors: Norihito Mochida, Kanagawa (JP); Yasuji Nakamura, Kanagawa (JP); Masanori Oshimi, Kanagawa (JP); Hirohiko Yoshida, Kanagawa (JP); Akihiko Sekiguchi, Kanagawa (JP); Eiji Machii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 501 days.

(21) Appl. No.: 12/935,462

(22) PCT Filed: Nov. 25, 2008

(86) PCT No.: PCT/JP2008/003458
§ 371 (c)(1),
(2), (4) Date: Sep. 29, 2010

(87) PCT Pub. No.: WO2009/122471
PCT Pub. Date: Oct. 8, 2009

(65) Prior Publication Data
US 2011/0025265 A1 Feb. 3, 2011

(30) Foreign Application Priority Data

Mar. 31, 2008 (JP) .................. 2008-091245

(51) Int. Cl.
*H02J 7/00* (2006.01)
*G06K 19/07* (2006.01)
*H04B 5/00* (2006.01)
*H01M 10/44* (2006.01)
*H02J 7/02* (2006.01)
*H01M 10/42* (2006.01)

(52) U.S. Cl.
CPC .......... *H01M 10/44* (2013.01); *G06K 19/0701* (2013.01); *Y02E 60/12* (2013.01); *H04B 5/0093* (2013.01); *H02J 7/025* (2013.01); *H01M 10/425* (2013.01); *H04B 5/0037* (2013.01)
USPC ....................................... 320/108

(58) Field of Classification Search
USPC ........................................ 320/108
See application file for complete search history.

(56) References Cited

U.S. PATENT DOCUMENTS 8,169,185 B2 * 5/2012 Partovi et al. ............. 320/108
2004/0245348 A1 12/2004 Nagaoka et al.
(Continued)

FOREIGN PATENT DOCUMENTS

CN 1941545 A 4/2007
(Continued)

OTHER PUBLICATIONS

International Search Report for PCT/JP2008/003458 mailed Feb. 17, 2009, 5 pages.
(Continued)

*Primary Examiner* — Richard V Muralidar
(74) *Attorney, Agent, or Firm* — Seed IP Law Group PLLC

(57) ABSTRACT

An object of the present invention is to provide an electronic device capable of receiving payment of a charge required for a charging process even though a secondary battery of the electronic device ran into an overdischarge state and also extricating itself from the overdischarge state, and a charger used for the same. A charger (3) executes a power transmission before it conducts a proximity noncontact communication with an electronic device (2), continues this power transmission until a preliminary charging stop notification signal is sent from the electronic device (2), and conducts the proximity noncontact communication regarding to a billing process with the electronic device (2) when the preliminary charging stop notification signal is sent. After the communication regarding to the billing process is ended, the charger (3) gives a charge of electricity to the electronic device (2) again. The electronic device (2) charges a secondary battery (28) by using the power transmission, then executes the charging up to a level at which the proximity noncontact communication regarding to the billing process can be conducted, then conducts the proximity noncontact communication regarding to the billing process with the charger (3), and then restarts the power transmission from the charger (3) to execute the charging until the secondary battery (28) is fully charged. In this manner, the noncontact charging and the proximity noncontact communication are executed between the electronic device (2) and the charger (3) in a time-division system.

14 Claims, 8 Drawing Sheets

(56) References Cited

U.S. PATENT DOCUMENTS

| | | |
|---|---|---|
| 2005/0068019 A1 | 3/2005 | Nakamura et al. |
| 2006/0287763 A1 | 12/2006 | Ochi et al. |
| 2007/0069687 A1 | 3/2007 | Suzuki |
| 2008/0062066 A1 | 3/2008 | Arai |
| 2008/0211455 A1* | 9/2008 | Park et al. ............ 320/108 |
| 2009/0021218 A1* | 1/2009 | Kelty et al. ............ 320/137 |
| 2009/0061768 A1 | 3/2009 | Simada |
| 2011/0218014 A1* | 9/2011 | Abu-Qahouq ............ 455/522 |

FOREIGN PATENT DOCUMENTS

| | | |
|---|---|---|
| JP | 7-95271 A | 4/1995 |
| JP | 2000-076399 A | 3/2000 |
| JP | 2001-109547 A | 4/2001 |
| JP | 2001-218391 A | 8/2001 |
| JP | 2002-034169 A | 1/2002 |
| JP | 2003-259027 A | 9/2003 |
| JP | 2005-110409 A | 4/2005 |
| JP | 2006-295469 A | 10/2006 |
| JP | 2006-353042 A | 12/2006 |
| JP | 2008-065660 A | 3/2008 |

OTHER PUBLICATIONS

Chinese Office Action, dated Aug. 31, 2012, for corresponding Chinese Application No. 200880128469.6, 15 pages. (with English Translation).

* cited by examiner

ELECTRONIC DEVICE, BATTERY CHARGER, AND ELECTRONIC DEVICE BATTERY-CHARGING SYSTEM

TECHNICAL FIELD

The present invention relates to an electronic device such as a cellular phone, or the like, a charger for charging the electronic device, and an electronic device charging system consisting of the electronic device and the charger.

BACKGROUND ART

In a mobile electronic device such as a cellular phone, or the like, normally a secondary battery that can be charged/discharged repeatedly with electricity is employed to secure a power source. Also, some of conventional electronic devices are designed to charge a secondary battery in a noncontact manner (see Patent Literature 1, for example).

In the electronic device that puts the secondary battery on charge in a noncontact manner, when a power receiving coil for noncontact charging and a loop antenna for proximity noncontact communication (Felica (registered trademark), or the like) are arranged in close vicinity to each other, it is probable that a malfunction is induced in the proximity noncontact communication due to an adverse influence of a harmonic noise generated in the power receiving coil.

Also, as the method of preventing the adverse influence of such harmonic noise, in Patent Literature 2, for example, the technology to shift a resonance frequency of one tuning circuit in two proximity noncontact communication antennas or more from resonance frequencies of the remaining tuning circuits respectively is disclosed.

Patent Literature 1: JP-A-2000-076399 (Japanese Patent No. 318086)
Patent Literature 2: JP-A-2006-295469

DISCLOSURE OF THE INVENTION

Problems that the Invention is to Solve

However, in such a situation that the electronic device starts the noncontact charging after it receives payment of a charge through the proximity noncontact communication, when the secondary battery of such electronic device is in an overdischarge state (a state in which the secondary battery falls below a voltage at which the equipment is enabled to operate), such electronic device cannot receive the payment of a charge because a proximity noncontact communicating function of the electronic device does not work due to lack of voltage. Therefore, it is impossible for the electronic device to start the noncontact charging because such electronic device cannot receive the payment of a charge, and as a result such electronic device cannot extricate itself from the overdischarge state permanently.

The present invention has been made in view of such circumstances, and it is an object of the present invention to provide an electronic device capable of receiving payment of a charge required for a charging process even though a secondary battery of the electronic device ran into an overdischarge state and also extricating itself from the overdischarge state, and a charger used for the same.

Means for Solving the Problems

A charger of the present invention that charges an electronic device employing a secondary battery as a power source and is capable of conducting a proximity noncontact communication with the electronic device, includes a power transmitting coil for transmitting an electric power to the electronic device by electromagnetic induction; an antenna used for the proximity noncontact communication; and a power transmission and communication controlling section for controlling a power transmission and the proximity noncontact communication; wherein the power transmission and communication controlling section starts a first power transmission when the electronic device is detected in a standby state, stops the first power transmission when a notification indicating that the power transmission is to be stopped is received from the electronic device during the first power transmission, starts the proximity noncontact communication after the first power transmission is ended, and starts a second power transmission when the proximity noncontact communication is ended.

According to this configuration, the charger executes the power transmission (first power transmission) before such charger conducts the proximity noncontact communication with the electronic device. Therefore, the charger can give a charge of electricity even when the secondary battery of the electronic device is in its overdischarge state, so that the charger can apply the billing process to the electronic device. Also, the charger executes the power transmission (second power transmission) again after such charger conducts the proximity noncontact communication with the electronic device. Therefore, the secondary battery of the electronic device can be charged continuously, so that the electronic device can extricate itself from the overdischarge state. In this case, the first charging corresponds to the preliminary charging, and the charging next to the completion of the billing process corresponds to the normal charging.

Also, the proximity noncontact communication is not conducted during the power transmission in which the harmonic noise is produced. Therefore, the proximity noncontact communication is never affected by the noise.

Also, the antenna and the power transmitting coil may be arranged in a superposed state.

Also, the antenna may be composed of a loop antenna, and a center of the loop antenna may be set to coincide with a center of the power transmitting coil.

Also, a part of a conductor of the loop antenna and a part of a conductor of the power receiving coil may be formed in common.

Also, the charger may further include a changeover switch connected to the antenna, for switching electrical conduction and cutoff to the antenna; wherein the power transmission and communication controlling section brings the changeover switch into a conduction state during the proximity noncontact communication, and brings the changeover switch into a cutoff state during the first power transmission or the second power transmission.

An electronic device of the present invention that employs a secondary battery, which is rechargeable by a charger, as a power source and is capable of conducting a proximity noncontact communication with the charger, includes a power receiving coil for receiving an electric power from the charger by electromagnetic induction; a secondary battery charged by the received electric power; an antenna used for the proximity noncontact communication; and a charging and communication controlling section for controlling a charging and the proximity noncontact communication; wherein the charging and communication controlling section starts a first charging for the secondary battery until a first condition is satisfied when an electric power is received via the power receiving coil, sending a notification indicating that a power transmission is to be stopped when the first condition is satisfied during the first charging, starts the proximity noncontact communication after the notification indicating that the power transmission is stopped, and starts a second charging for the secondary battery until a second condition is satisfied when the proximity noncontact communication is ended.

According to this configuration, when the electric power is received via the power receiving coil, the charger executes the charging (first charging) for the secondary battery in a period until the first condition is satisfied. Therefore, the electronic device can apply the billing process to the charger even when the secondary battery falls into its overdischarge state. Also, the electronic device conducts the proximity noncontact communication after the first condition is satisfied, and the electronic device executes the charging of the second battery (second charging) after the proximity noncontact communication until the second condition is satisfied. Therefore, the electronic device can extricate itself from its overdischarge state. Also, the charging is stopped at a point of time when the first condition is satisfied, and this state is continued until the proximity noncontact communication is ended. Therefore, the influence of noise on the proximity noncontact communication is not caused during such state.

The antenna and the power receiving coil may be arranged in a superposed state.

Also, the antenna may be composed of a loop antenna, and a center of the loop antenna may be set to coincide with a center of the power receiving coil.

Also, a part of a conductor of the loop antenna and a part of a conductor of the power transmitting coil may be formed in common.

Also, the electronic device may further include a changeover switch connected to the antenna, for switching electrical conduction and cutoff to the antenna; wherein the charging and communication controlling section brings the changeover switch into a conduction state during the proximity noncontact communication, and brings the changeover switch into a cutoff state during the first charging or the second charging.

Also, the first condition may correspond to a situation that a voltage of the secondary battery is more than a first predetermined value, the second condition may correspond to a situation that the voltage of the secondary battery is a second predetermined value, and the second predetermined value may be larger than the first predetermined value.

Also, the first condition may correspond to a situation that a predetermined time for a continuous charging has elapsed, and the second condition may correspond to a situation that the voltage of the secondary battery is a second predetermined value.

An electronic device charging system of the present invention, includes the above charger; and the above electronic device.

Advantages of the Invention

According to the present invention, the electronic device and the charger, which are capable of receiving payment of a charge required for the charging even though the secondary battery of the electronic device ran into an overdischarge state and also extricating themselves from the overdischarge state, can be provided.

Figure 1:
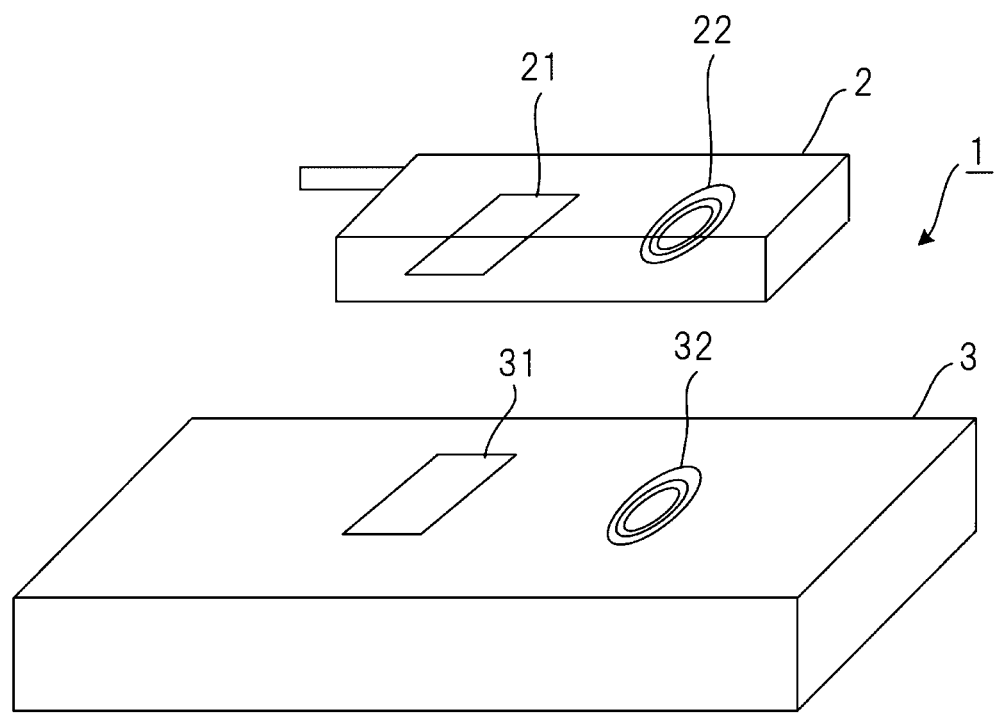
FIG. 1 A perspective view showing an outline of an electronic device charging system according to Embodiment 1 of the present invention.

DESCRIPTION OF REFERENCE NUMERALS AND SIGNS 1, 1A electronic device charging system
2, 2A electronic device
3, 3A charger
21 proximity noncontact communication antenna
22 noncontact power-receiving secondary coil
23 proximity noncontact communication secondary controlling portion
24 input signal deciding portion
25 noncontact charging secondary controlling portion
26 battery charging controlling portion
27 remaining battery level detecting portion
28 secondary battery
29a, 29b, 35a, 35b changeover switch
30, 36 conflict controlling portion
31 proximity noncontact communication external unit antenna
32 noncontact feeding primary coil
33 controlling portion of a proximity noncontact communication external unit
34 noncontact charging primary controlling portion
37, 39 charging and communication controlling portion
38, 40 power-transmitting communication controlling portion

BEST MODE FOR CARRYING OUT THE INVENTION

Preferred embodiments for carrying out the present invention will be explained with reference to the drawings hereinafter.

Embodiment 1

FIG. 1 is a perspective view showing an outline of an electronic device charging system according to Embodiment 1 of the present invention. In FIG. 1, an electronic device charging system 1 of the present embodiment includes an electronic device 2 such as a cellular phone, PHS (Personal Handy-phone System), PDA (Personal Digital Assistant), or the like, and a charger 3 for charging the electronic device 2 with electricity in a noncontact manner. The electronic device 2 can charge a rechargeable battery (secondary battery) by receiving a power feeding from the charger 3 in a noncontact state with the charger 3. Here, the "noncontact state" signifies such a state that the electronic device 2 and the charger 3 can transfer an electric power (radio wave), signals, etc. mutually in a state that both equipments are not directly connected electrically via metal terminals.

In the electronic device 2, a proximity noncontact communication antenna 21 for conducting the proximity noncontact communication with the charger 3, and a noncontact power-receiving secondary coil 22 for receiving an electric power from the charger 3 by electromagnetic induction are provided on the same plane of an equipment main body. In the charger 3, a proximity noncontact communication external unit antenna 31 for conducting the proximity noncontact communication with the electronic device 2, and a noncontact feeding primary coil 32 for transmitting an electric power to the electronic device 2 by electromagnetic induction are provided on the same plane of a charger main body.

Figure 2:
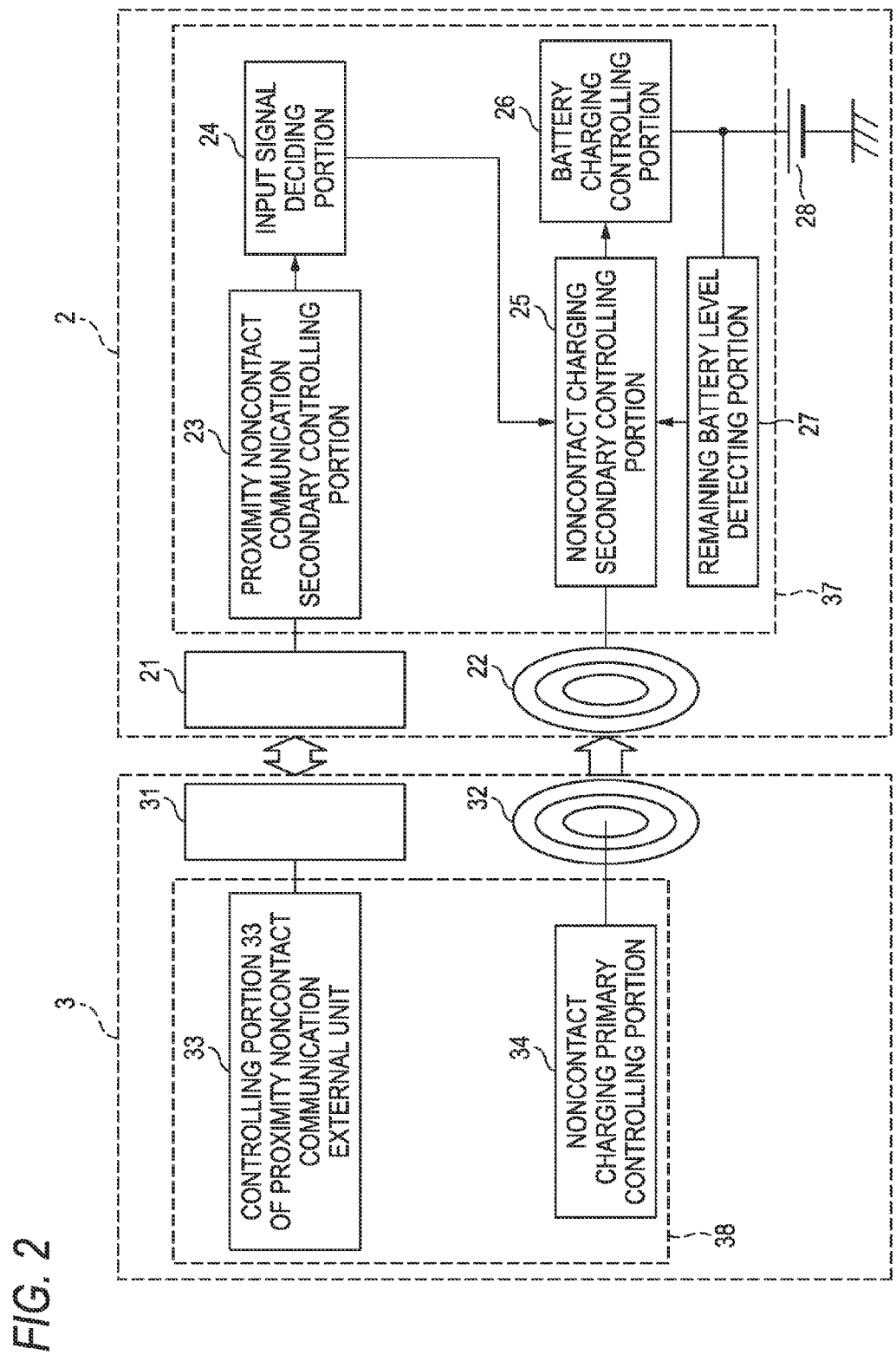
FIG. 2 A block diagram showing a schematic configuration of an electronic device and a charger of the electronic device charging system in FIG. 1.

FIG. 2 is a block diagram showing a schematic configuration of the electronic device 2 and the charger 3 of the electronic device charging system 1 according to the present embodiment. In FIG. 2, the electronic device 2 includes the proximity noncontact communication antenna 21 and the noncontact power-receiving secondary coil 22 both described above, a proximity noncontact communication secondary controlling portion 23, an input signal deciding portion 24, a noncontact charging secondary controlling portion 25, a battery charging controlling portion 26, a remaining battery level detecting portion 27, and a rechargeable secondary battery 28 such as a lithium ion battery, or the like. The proximity noncontact communication antenna 21 is used to communicate with the proximity noncontact communication external unit antenna 31 of the charger 3. The noncontact power-receiving secondary coil 22 is coupled electromagnetically to the noncontact feeding primary coil 32 of the charger 3, and is used to receive a supply of an electric power. Also, the noncontact power-receiving secondary coil 22 is used to transmit ID information, charging completion signal, etc. to the charger 3 by utilizing a load modulation, or the like.

The proximity noncontact communication secondary controlling portion 23 receives a billing request signal transmitted from the charger 3 via the proximity noncontact communication antenna 21, performs a billing process in accordance with the received billing request signal, and transmits a billing process completion signal to the charger 3 via the proximity noncontact communication antenna 21 after the billing process. The input signal deciding portion 24 makes a decision of a communication transmission mode (billing) state in the proximity noncontact communication secondary controlling portion 23.

The noncontact charging secondary controlling portion 25 transmits ID information assigned to the electronic device 2 from the noncontact power-receiving secondary coil 22 to the charger 3 by utilizing a load modulation, or the like, and receives an electric power transmitted from the charger 3 via the noncontact power-receiving secondary coil 22. Also, the noncontact charging secondary controlling portion 25 transmits a charging completion signal notifying that the charging process is completed, to the charger 3 from the noncontact power-receiving secondary coil 22 to the charger 3 by utilizing the load modulation, or the like. Also, the noncontact charging secondary controlling portion 25 decides whether a remaining battery level detected by the remaining battery level detecting portion 27 is in excess of a predetermined voltage or is below the predetermined voltage. The remaining battery level detecting portion 27 detects a battery voltage of the secondary battery 28 as a remaining battery level. The battery charging controlling portion 26 controls start/stop of the charging of the secondary battery 28, based on a decision of the remaining battery level made by the noncontact charging secondary controlling portion 25. The battery charging controlling portion 26 performs the charging of the secondary battery 28 by using an electric power received by the noncontact power-receiving secondary coil 22.

Also, in the electronic device 2, the proximity noncontact communication secondary controlling portion 23, the input signal deciding portion 24, the noncontact charging secondary controlling portion 25, the battery charging controlling portion 26, and the remaining battery level detecting portion 27 constitute a charging and communication controlling portion 37 that controls the charging and the proximity noncontact communication. Also, in the charger 3, a controlling portion 33 of a proximity noncontact communication external unit and a noncontact charging primary controlling portion 34 constitute a power-transmitting communication controlling portion 38 that controls the power transmission and the proximity noncontact communication.

Figure 3:
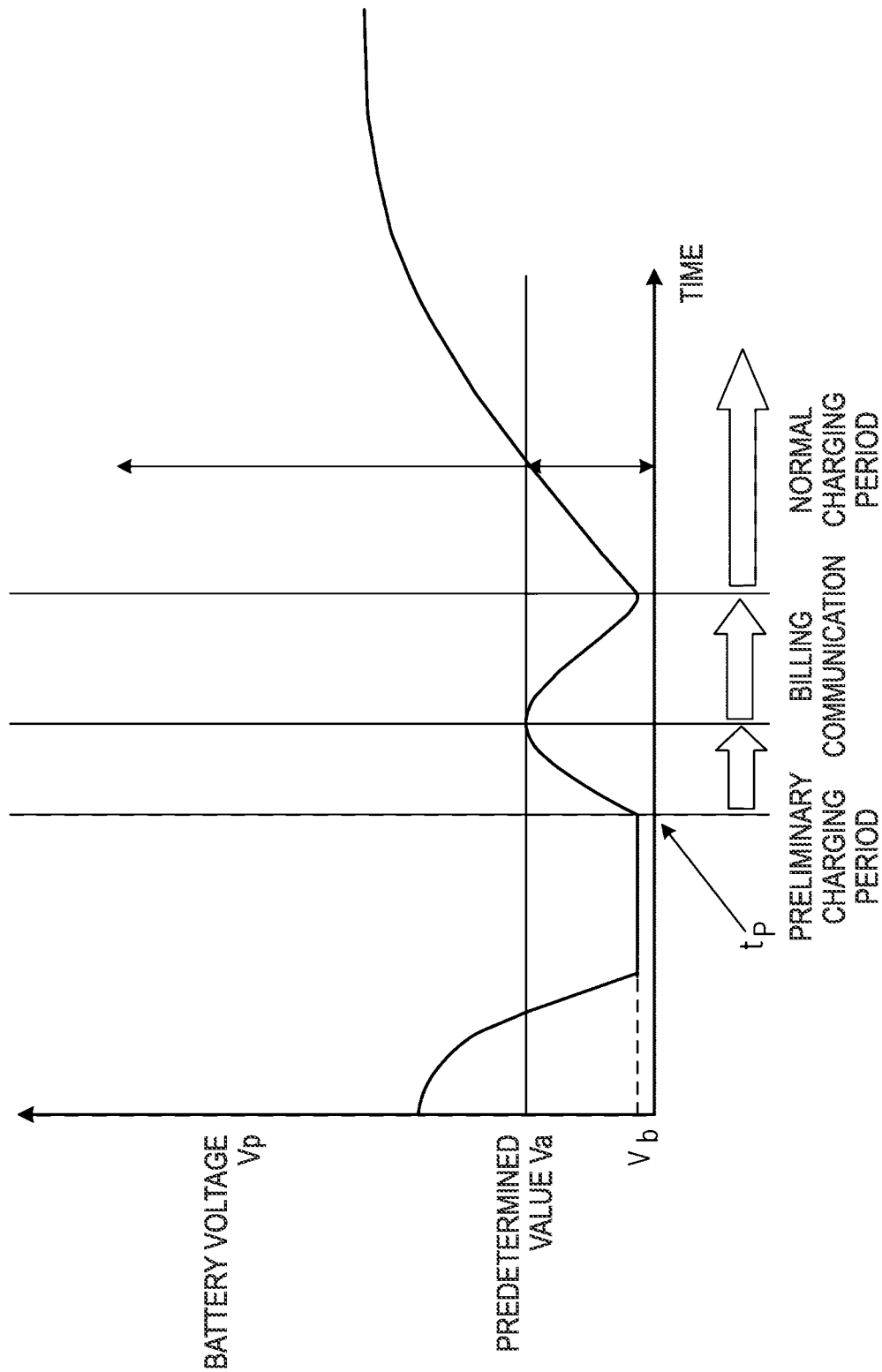
FIG. 3 A view showing a charging operation in the electronic device in the electronic device charging system in FIG. 1.

FIG. 3 is a view showing a charging and billing communication operations of the electronic device 2. In FIG. 3, an ordinate denotes a battery voltage of the secondary battery 28, and an abscissa denotes a time. Also, a predetermined value (first predetermined value) Va denotes a minimum voltage value at which the electronic device charging system 1 can execute a billing process. In this event, the "billing" in this case denotes the payment of charge demanded when the electronic device 2 carries out the charging by using the charger 3.

Here, such a situation is assumed that a battery voltage Vp of the secondary battery 28 goes down according to the use of the electronic device 2, and then falls down to Vb (<Va) as an overdischarge state in which the battery voltage Vp falls below a predetermined value Va. In a state that the secondary battery 28 is kept as it is in this overdischarge state, when the user becomes aware of the overdischarge state of the electronic device 2 and then sets the electronic device 2 on the charger 3 (when the user sets the electronic device 2 on the charger 3 a time tp), the charging is started from the set time tp and a battery voltage Vp of the secondary battery 28 goes gradually up. When a battery voltage Vp of the secondary battery 28 reaches a predetermined value Va, the electronic device 2 is brought into a state in which the billing communication can be conducted. Accordingly, the billing communication is started. A battery voltage Vp of the secondary battery 28 comes gradually down because the billing communication is conducted, a normal charging is started after the billing communication is ended. The normal charging is continued until a battery voltage Vp of the secondary battery 28 goes to a value (second predetermined value) at which a battery voltage Vp of the secondary battery 28 corresponds to a fully charged voltage. In this case, it is a matter of course that, when the electronic device 2 is removed from the charger 3 during the normal charging period, the charging is suspended.

In this manner, in such a situation that the electronic device 2 can employ the secondary battery 28, which is rechargeable by the charger 3 that gives a charge of electricity in a noncontact system, as a power source and can hold the proximity noncontact communication with the charger 3, when the electric power is received via the noncontact power-receiving secondary coil 22, the electronic device 2 charges (preliminarily charges) the secondary battery 28 by using the received electric power until the battery voltage Vp exceeds a predetermined value Va, and then transmits a preliminary charging stop notification signal to the effect that a supply of the electric power should be stopped to the charger 3 when the battery voltage Vp is in excess of a predetermined value Va.

Immediately after this, the electronic device 2 starts to hold the billing communication as the proximity noncontact communication with the charger 3. Then, when the billing communication is ended, the electronic device 2 charges (normally charges) the secondary battery 28 by using the electric power received from the charger 3 until the battery voltage Vp is increased to a value that is larger than a predetermined value Va.

Returning to FIG. 2, the charger 3 includes the proximity noncontact communication external unit antenna 31 and the noncontact feeding primary coil 32 both described above, the controlling portion 33 of the proximity noncontact communication external unit, and the noncontact charging primary controlling portion 34. The controlling portion 33 of the proximity noncontact communication external unit transmits a billing request signal to the electronic device 2, and receives a billing process completion signal from the electronic device 2. The noncontact charging primary controlling portion 34 executes the supply and stop of the electric power for the electronic device 2 side. Also, the noncontact charging primary controlling portion 34 detects the presence or absence of the load, in response to whether or not an electric current flows through the noncontact feeding primary coil 32. In this case, when the magnetic material that is electromagnetically coupled to the noncontact feeding primary coil 32 is located in vicinity of the noncontact feeding primary coil 32, the noncontact charging primary controlling portion 34 can detect the load based on the fact that an electric current flows through the noncontact feeding primary coil 32.

Also, the noncontact charging primary controlling portion 34 detects a foreign object in response to a value of the electric current flowing through the noncontact feeding primary coil 32. In this case, a value of the electric current flowing through the noncontact feeding primary coil 32 is different between the noncontact power-receiving secondary coil 22 of the electronic device 2 and other body (e.g., ten yen coin). Therefore, if a value of the electric current flowing through the noncontact feeding primary coil 32 is stored when the noncontact power-receiving secondary coil 22 is located closely, the noncontact charging primary controlling portion 34 can decide a difference between the electronic device 2 and other body by comparing the detected value with this stored value. In this event, if a value of the electric current flowing through the noncontact feeding primary coil 32 is also stored when other body (e.g., ten yen coin, or the like) other than the noncontact power-receiving secondary coil 22 is put on the noncontact feeding primary coil 32, the noncontact charging primary controlling portion 34 can decide the concerned body.

Also, the noncontact charging primary controlling portion 34 conducts an ID authentication, based on the signal that is received by the noncontact feeding primary coil 32. In this case, the ID information is transmitted from the electronic device 2 by setting the electronic device 2 on the charger 3. Therefore, the noncontact charging primary controlling portion 34 acquires this ID information and conducts the ID authentication.

In this manner, the charger 3 can charge the electronic device 2, in which the secondary battery 28 is used as the power source, in a noncontact system, and can hold the proximity noncontact communication with the electronic device 2. Also, the charger 3 starts to transmit the electric power to the electronic device 2 when it detects the electronic device 2 in a standby mode. After the transmission of the electric power is started, the charger 3 stops the transmission of the electric power when it receives a preliminary charging stop notification signal indicating the effect that the transmission of the electric power should be stopped, from the electronic device 2. Immediately after this stop, the charger 3 starts to hold the billing communication as the proximity noncontact communication with the electronic device 2. Then, the charger 3 starts the transmission of the electric power when this billing communication is ended.

Figure 4:
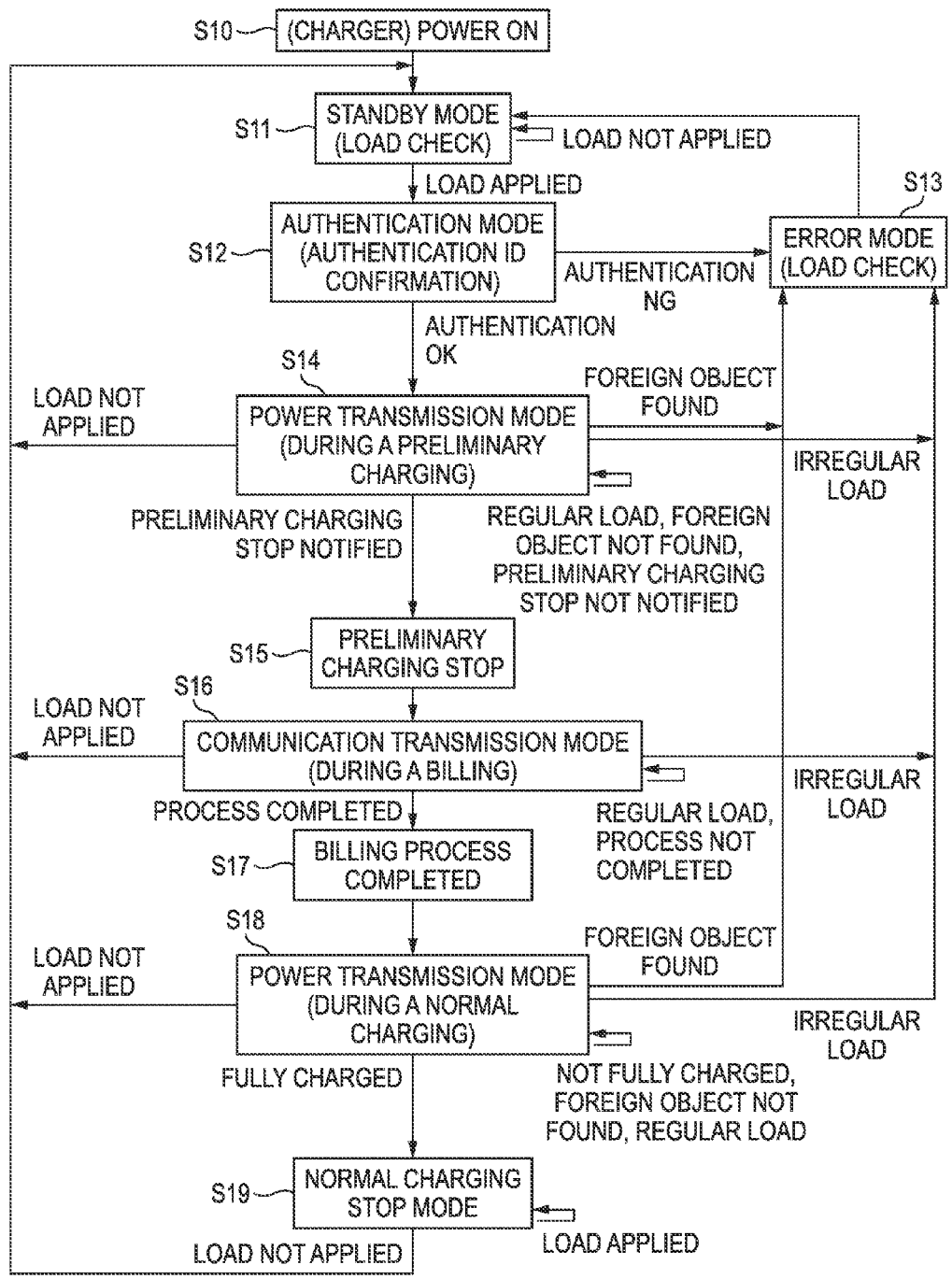
FIG. 4 A flowchart showing an operation of the charger of the electronic device charging system in FIG. 1.

Next, respective operations of the electronic device 2 and the charger 3 in the electronic device charging system 1 according to the present embodiment will be explained hereunder. FIG. 4 is a flowchart showing an operation of the charger 3. In FIG. 4, when a power source of the charger 3 is turned ON, the charger 3 is started (step S10). After the start, the charger 3 goes to a standby mode to check the load (step S11). That is, when the charger 3 goes to a standby mode, this charger 3 checks a current value of the noncontact feeding primary coil 32 to decide whether or not the load is present. If it is decided by this check that the load is present, the charger 3 goes to an authentication mode to confirm an authentication ID (step S12). If it is decided by this confirmation that the authentication ID cannot be confirmed, the charger 3 decides an authentication error because the regular load is not applied. Then, the charger 3 goes to an error mode. Then, the charger 3 checks the load in this error mode (step S13), and then the charger 3 goes back to step S11. In step S12, if it is decided that the authentication ID can be confirmed, the charger 3 makes a decision of a power transmission mode because the authentication ID is OK, and then executes the power transmission (first power transmission) for the purpose of the preliminary charging (step S14).

During the preliminary charging, it is still decided whether or not the load is applied, whether or not the preliminary charging stop notification is issued, and whether or not the foreign object is found. If no load is applied (i.e., the electronic device 2 is removed from the charger 3), it is decided that the load is not applied, and the charger 3 goes back to step S11. If the preliminary charging stop notification is issued, the preliminary charging is stopped (step S15). If the foreign object is found, the charger 3 goes back to step S13. In contrast to the above, if it is decided that the regular load (whose ID is authenticated) is applied, no foreign object is found, and the preliminary charging notification is not issued, the preliminary charging is still continued as it is.

If the charger 3 receives the preliminary charging stop notification from the electronic device 2, it stops the preliminary charging (step S15). Then, the charger 3 goes to the communication transmission mode and executes a billing process (step S16). During the billing process, it is still decided whether or not the load is applied, whether or not the irregular load (whose ID is not authenticated) is applied, and whether or not the billing process is completed. If no load is applied (i.e., the electronic device 2 is removed from the charger 3), it is decided that the load is not applied, and the charger 3 goes back to step S11. If the irregular load is applied, the charger 3 goes to an error mode to check the load, and then the charger 3 goes back to step S11. If the billing process is completed, such billing process is completed (step S17). In contrast to the above, if it is decided that the regular load is applied and the billing process is not completed yet, the charger 3 continues the billing process as it is.

After the billing process is completed, the charger 3 goes to a power transmission mode. Then, the charger 3 transmits the electric power (second power transmission) to charge the secondary battery 28 until the secondary battery 28 is brought into a fully charged state (step S18). During the normal charging, it is still decided whether or not the load is applied, whether or not the irregular load is applied, and whether or not the battery is fully charged. If no load is applied (i.e., the electronic device 2 is removed from the charger 3), it is decided that the load is not applied, and the charger 3 goes back to step S11. If the irregular load is applied, the charger 3 goes to an error mode to check the load, and then goes back to step S11. If the battery is fully charged, the charger 3 goes to a normal charging stop mode (step S19). In contrast to the above, if it is decided that the battery is not fully charged, the foreign object is not found, and the regular load is applied, the charger 3 still continues the normal charging as it is.

If the charger 3 goes to a normal charging stop mode after it is decided that the battery is fully charged, the normal charging is stopped. In this event, it is decided whether or not the load is applied until the normal charging is stopped. If it is decided that the load is applied, this decision is still continued. If it is decided that the load is not applied, this decision is ended and the charger 3 goes back to step S11.

In this manner, the charger 3 checks whether or not the load is present on the noncontact feeding primary coil 32. If the load is present, the authentication ID is confirmed. If the authentication ID is confirmed, it is decided that the regular load is applied, and the power feeding for the preliminary charging is executed. If the preliminary charging is ended, the billing process for the regular load is executed. If the billing process is ended, the normal charging for the regular load is executed.

Figure 5:
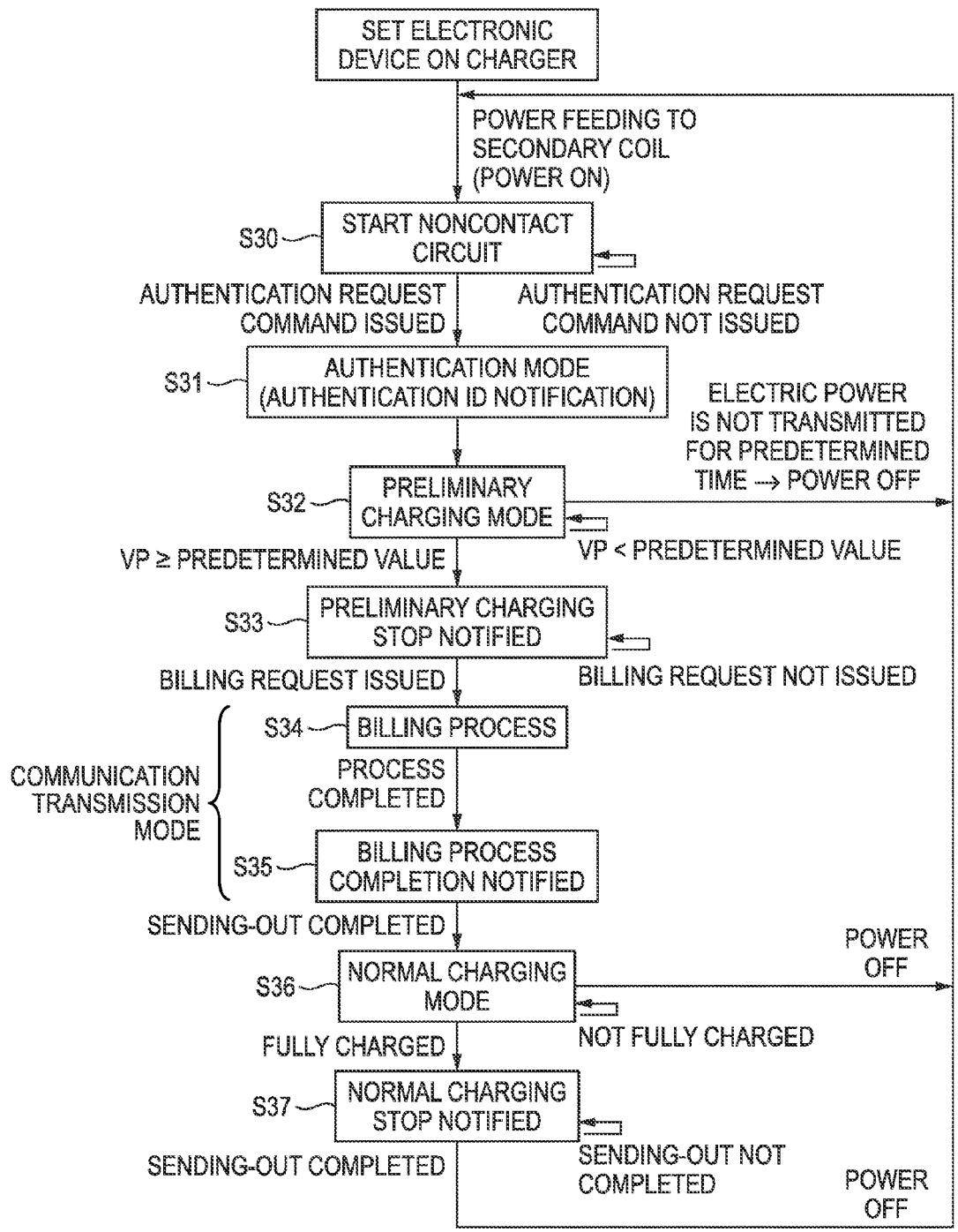
FIG. 5 A flowchart showing an operation of the electronic device of the electronic device charging system in FIG. 1.

Next, FIG. 5 is a flowchart showing an operation of the electronic device 2. In FIG. 5, when the electronic device 2 is set on the charger 3 and the electric power is fed from the charger 3, the noncontact circuits (the proximity noncontact communication secondary controlling portion 23, the input signal deciding portion 24, the noncontact charging secondary controlling portion 25, the battery charging controlling portion 26, and the remaining battery level detecting portion 27) are started in response to this power feeding (step S30). Then, the electronic device 2 decides whether or not an authentication request command is issued from the charger 3. If the authentication request command is not issued, the electronic device 2 repeats this deciding operation until the authentication request command is issued. If the authentication request command is issued, the electronic device 2 goes to an authentication mode and then notifies the charger 3 of the authentication ID (step S31).

After the electronic device 2 notified the charger 3 of the authentication ID, such electronic device 2 goes to a preliminary charging mode, and starts the charging (first charging) for the secondary battery 28. During the preliminary charging, it is decided whether or not the battery voltage Vp of the secondary battery 28 is more than a predetermined value Va or is below a predetermined value Va, and also it is decided whether or not an electric power is not transmitted for a predetermined time from the charger 3 (step S32). If an electric power is not transmitted for a predetermined time from the charger 3, a power source is turned OFF. Also, if the battery voltage Vp of the secondary battery 28 is below a predetermined value Va, the preliminary charging is continued until the battery voltage Vp reaches a predetermined value Va. Also, if the battery voltage Vp of the secondary battery 28 is more than a predetermined value Va, the electronic device 2 notifies the charger 3 of the preliminary charging stop (step S33). Then, it is decided whether or not the billing request is issued from the charger 3. If the billing request is not issued, this decision is repeated. In contrast, if the billing request is issued, the billing process is executed (step S34). Then, if the billing process is completed, the electronic device 2 notifies the charger 3 of the billing process completion (step S35).

After the sending-out of the billing process completion notification is completed, the electronic device 2 goes to the normal charging mode, and then starts the normal charging (second charging)(step S36). During the normal charging, it is decided whether or not the battery is fully charged. If the battery is not fully charged (i.e., the full charging is not attained), the electronic device 2 continues the normal charging. In contrast, if the battery is fully charged (i.e., the full charging is attained), the electronic device 2 notifies the charger 3 of the normal charging stop (step S37). Here, when the electronic device 2 is removed from the charger 3 during the normal charging, it automatically turns OFF the power source. Also, any voltage value may be employed as a standard of the full charging if such voltage value exceeds a predetermined value Va, and this standard may be decided in accordance with the specification of the secondary battery 28. The value decided at this time corresponds to a second predetermined value that is in excess of a predetermined value (first predetermined value).

During the normal charging stop notification process, the electronic device 2 decides whether or not the sending-out of the normal charging stop notification is completed. If the sending-out of the normal charging stop notification is not completed, the electronic device 2 continues the normal charging stop notification process. After the sending-out of the normal charging stop notification is completed, the electronic device 2 automatically turns OFF the power source.

Figure 6:
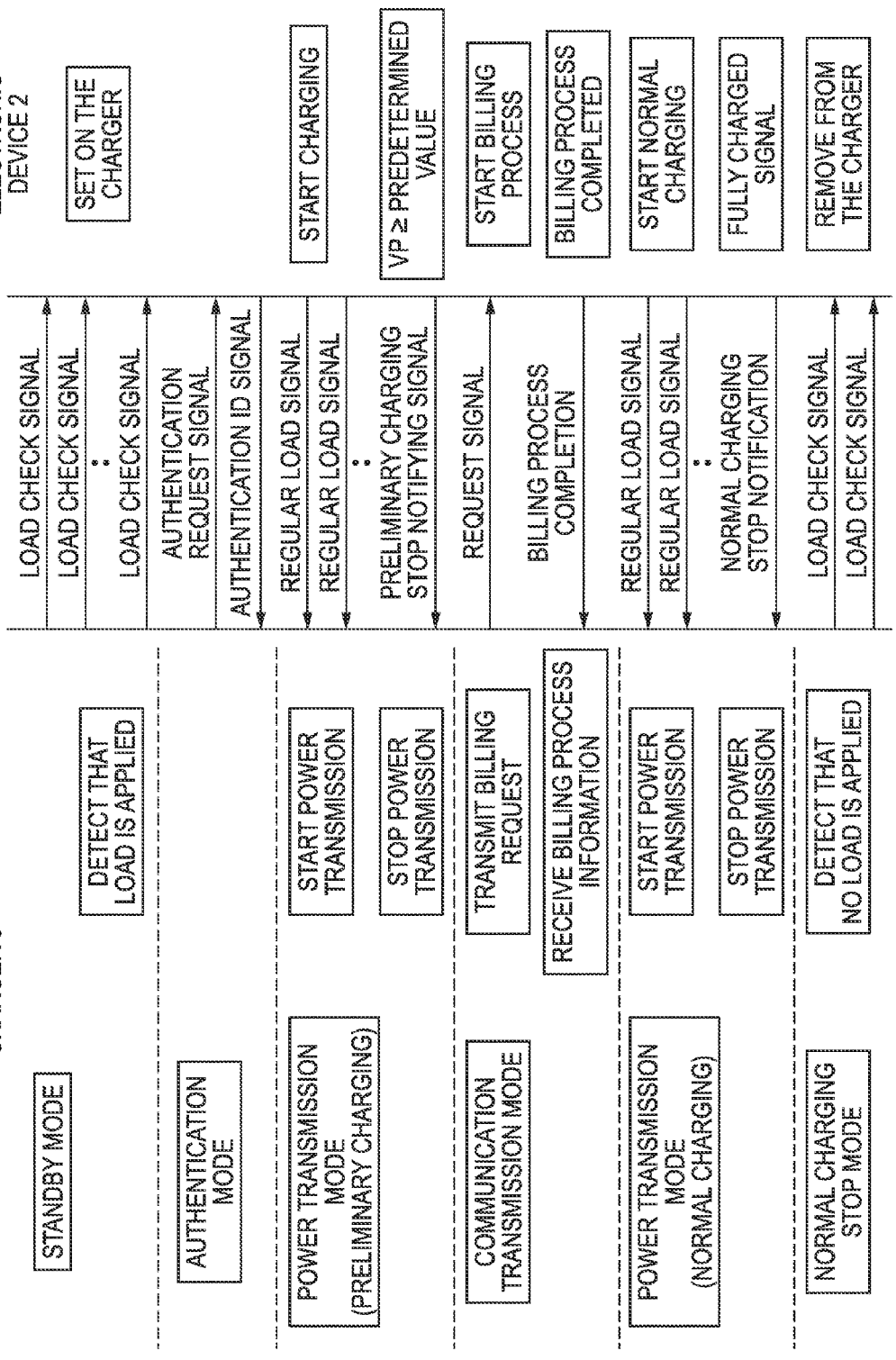
FIG. 6 A sequence diagram showing signal transmission/reception between the electronic device and the charger of the electronic device charging system in FIG. 1.

FIG. 6 is a sequence diagram showing signal transmission/reception between the electronic device 2 and the charger 3. As shown in FIG. 6, the charger 3 goes to a standby mode at first, and sends out periodically a load check signal to detect whether or not the load is applied. Then, when the charger 3 detects the load, such charger 3 goes to an authentication mode and then sends out an authentication request signal to authenticate the load. When an authentication ID signal is sent back from the load in response to the authentication request signal, the charger 3 executes the authentication process based on this authentication ID signal. If the authentication is OK, the charger 3 goes to a power transmission mode for the preliminary charging, and starts the transmission of the electric power. The electronic device 2 acting as the load receives the power feeding from the charger 3, and transmits periodically a normal load signal until the battery voltage Vp of the secondary battery 28 exceeds a predetermined value Va. Then, when the battery voltage Vp exceeds a predetermined value Va, the electronic device 2 decides that the preliminary charging is finished, and sends out the preliminary charging stop notification signal.

When the charger 3 receives the preliminary charging stop notification signal from the electronic device 2, such charger 3 stops the transmission of the electronic power and goes to the communication transmission mode. When the charger 3 goes to the communication transmission mode, such charger 3 transmits a billing request signal to the electronic device 2. When the electronic device 2 receives the billing request signal, such equipment starts a billing process. Then, when the billing process is completed, the electronic device 2 transmits the signal indicating the billing process completion to the charger 3. When the charger 3 receives the signal indicating the billing process completion from the electronic device 2, such charger 3 goes to the power transmission mode for the normal charging and starts the transmission of the electric power. The electronic device 2 starts the normal charging of the secondary battery 28 as soon as the transmission of the electric power is started from the charger 3. Then, the electronic device 2 transmits the normal load signal periodically while doing the normal charging. Then, when the secondary battery 28 is fully charged, the electronic device 2 transmits a fully charged signal as the normal charging stop notification to the charger 3. When the charger 3 receives the fully charged signal from the electronic device 2, such charger 3 stops the transmission of the electric power and goes to the normal charging stop mode from the power transmission mode, and sends out periodically the load check signal. Then, when the electronic device 2 is removed from the charger 3, the charger 3 detects that no load is applied.

As described above, according to the electronic device charging system 1 of the present embodiment, the noncontact charging and the proximity noncontact communication are conducted between the electronic device 2 and the charger 3 at the time-division system. At the time when the secondary battery 28 of the electronic device 2 is in its overdischarge state, the electronic device 2 receives the power feeding from the charger 3 and then executes the preliminary charging to get the electric power that is needed merely to apply the billing process to the secondary battery 28, then conducts the billing communication required for the billing process between the electronic device 2 and the charger 3 after the completion of the preliminary charging, and then receives the power feeding from the charger 3 and then execute the normal charging after the completion of the billing process until the secondary battery 28 is fully charged. Therefore, the electronic device 2 can receive the billing process information even when the secondary battery 28 of the electronic device 2 is in its overdischarge state, and also the electronic device 2 can extricate itself from the overdischarge state by executing the normal charging. Also, the proximity noncontact communication is not conducted during a period in which the harmonic noise is produced from the noncontact power-receiving secondary coil 22. Therefore, the proximity noncontact communication is never affected by the noise.

Embodiment 2

Figure 7:
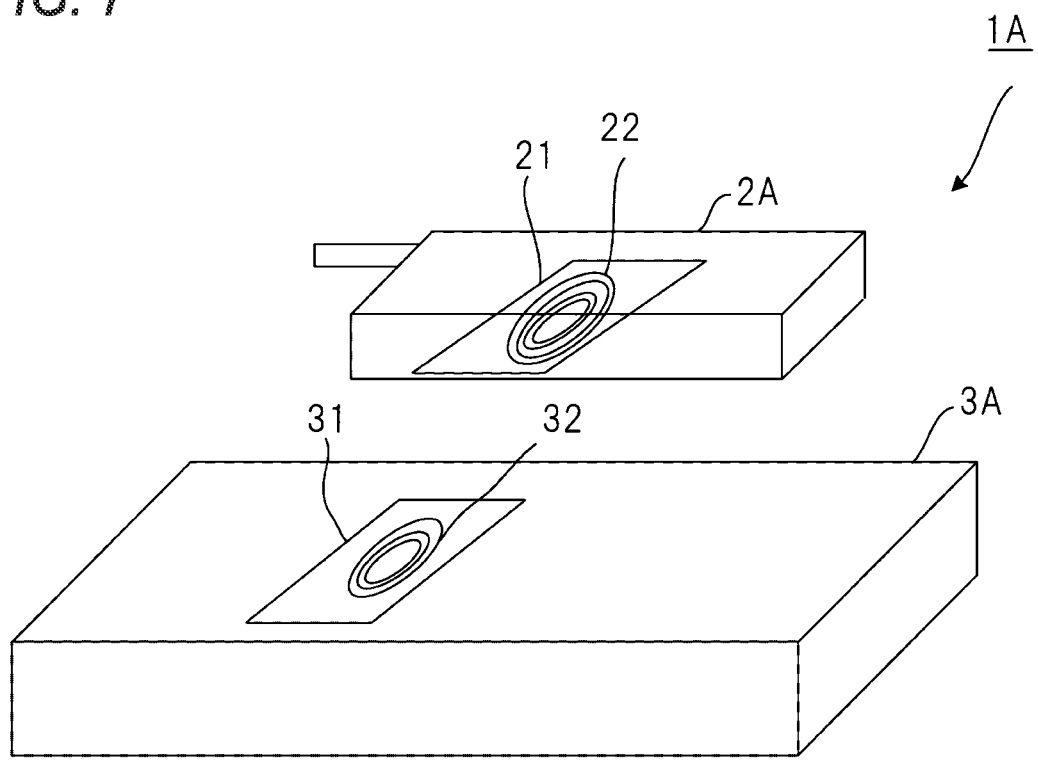
FIG. 7 A perspective view showing an outline of an electronic device charging system according to Embodiment 2 of the present invention.
Figure 8:
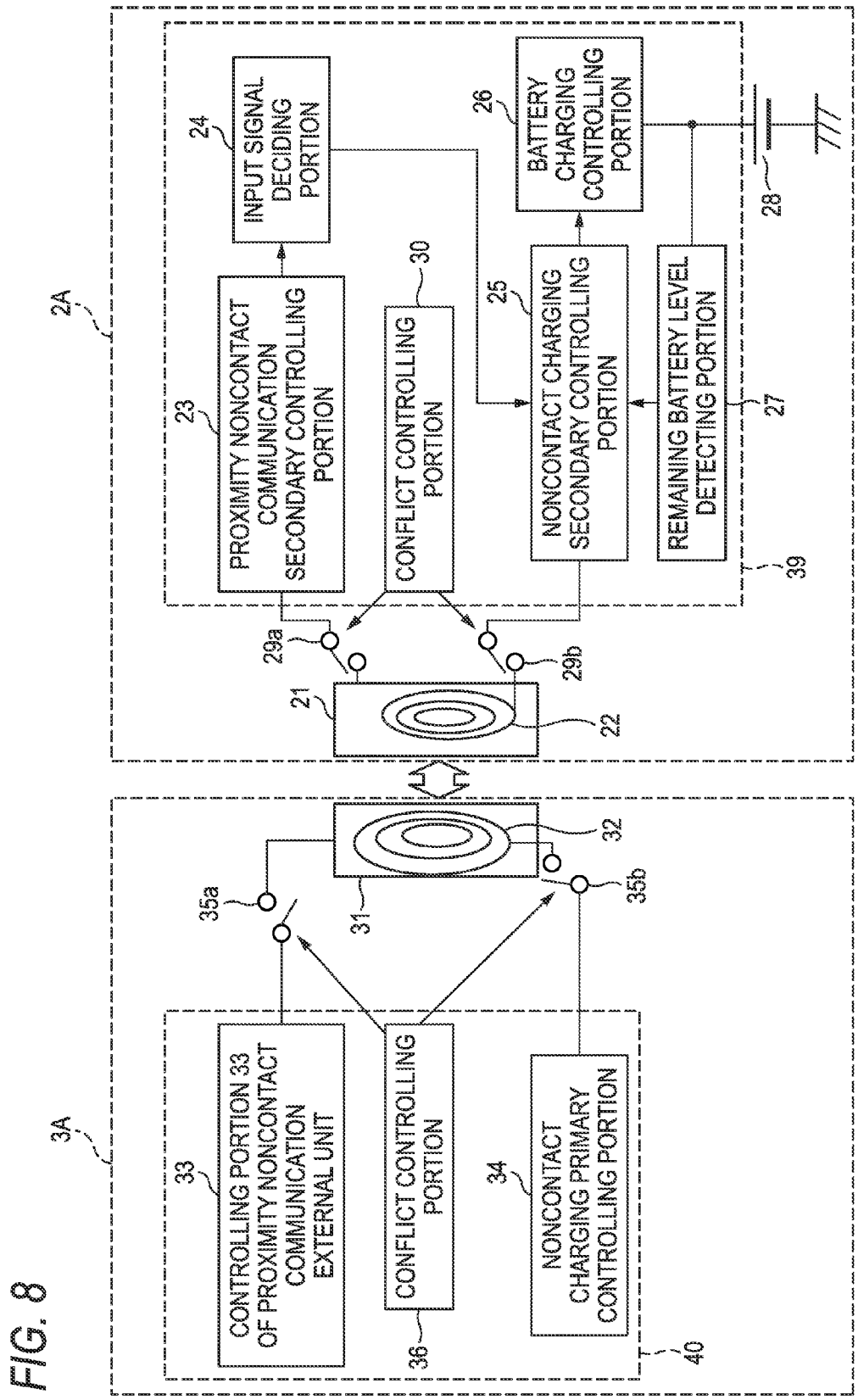
FIG. 8 A block diagram showing a schematic configuration of an electronic device and a charger of the electronic device charging system in FIG. 7.

FIG. 7 is a perspective view showing an outline of an electronic device charging system according to Embodiment 2 of the present invention. Also, FIG. 8 is a block diagram showing a schematic configuration of an electronic device 2A and a charger 3A of the electronic device charging system 1A according to the present embodiment. As shown in FIG. 7 or FIG. 8, the electronic device charging system 1A according to the present embodiment is constructed such that the proximity noncontact communication antenna and the noncontact charging coil are arranged in the electronic device 2A and the charger 3A in a superposed state respectively. That is, in the electronic device 2A, the proximity noncontact communication antenna 21 and the noncontact power-receiving secondary coil 22 are arranged in a superposed state. More concretely, the proximity noncontact communication antenna 21 is composed of a loop antenna, and the noncontact power-receiving secondary coil 22 is arranged such that its center coincides with a center of the loop antenna. Also, in the charger 3A, the proximity noncontact communication external unit antenna 31 and the noncontact feeding primary coil 32 are arranged in a superposed state. More concretely, like the configuration of the electronic device 2A, the proximity noncontact communication external unit antenna 31 is composed of a loop antenna, and the noncontact feeding primary coil 32 is arranged such that its center coincides with a center of the loop antenna. Because the proximity noncontact communication antenna and the noncontact charging coil are arranged in a superposed state, an occupied area of them in the equipment main bodies respectively can be reduced, and such arrangement can respond to a size reduction of the electronic device 2A and the charger 3A. Further, a center of the proximity noncontact communication antenna 21 is made to coincides with a center of the charger the noncontact power-receiving secondary coil 22, and also a center of the proximity noncontact communication external unit antenna 31 is made to coincides with a center of the noncontact feeding primary coil 32. Therefore, positions of the proximity noncontact communication antenna 21 and the proximity noncontact communication external unit antenna 31 can be set automatically at a time to coincide with positions of the noncontact power-receiving secondary coil 22 and the noncontact feeding primary coil 32.

In addition, in the electronic device 2A, when the proximity noncontact communication antenna 21 is composed of the loop antenna, a part of conductor of the loop antenna and a part of the conductor of the noncontact power-receiving secondary coil 22 may be formed in common. Accordingly, a center of the proximity noncontact communication antenna 21 and a center of the noncontact power-receiving secondary coil 22, both being formed of the common conductor, coincide naturally with each other. Therefore, the volume and the mass of the proximity noncontact communication antenna 21 and the noncontact power-receiving secondary coil 22 can be reduced in total, and a reduction in size and mass of the electronic device 2A can be achieved.

Similarly, in the charger 3A, when the proximity noncontact communication external unit antenna 31 is composed of the loop antenna, a part of conductor of the loop antenna and a part of the conductor of the noncontact feeding primary coil 32 may be formed in common. Accordingly, a center of the proximity noncontact communication external unit antenna 31 and a center of the noncontact feeding primary coil 32, both being formed of the common conductor, coincide naturally with each other. Therefore, the volume and the mass of the proximity noncontact communication external unit antenna 31 and the noncontact feeding primary coil 32 can be reduced in total, and a reduction in size and mass of the charger 3A can be achieved.

Also, when the proximity noncontact communication antenna and the noncontact charging coil are arranged in the electronic device 2A and the charger 3A in a superposed manner respectively, an interference is caused between them. Thus, while one component is used, the other component is cut off in operation from the circuit. In order to cut off the unused component from the circuit, the electronic device 2A is equipped with changeover switches 29a, 29b, and a conflict controlling portion 30 for controlling the switching of the changeover switches 29a, 29b. Also, the charger 3A is equipped with changeover switches 35a, 35b, and a conflict controlling portion 36 for controlling the switching of the changeover switches 35a, 35b. For example, when the charger 3A gives a charge of electricity to the electronic device 2A, the conflict controlling portion 36 of the charger 3A turns OFF the changeover switch 35a (open state, cutoff state) and also turns ON the changeover switch 35b (closed state, conduction state), and the conflict controlling portion 30 of the electronic device 2A turns OFF the changeover switch 29a (open state, cutoff state) and also turns ON the changeover switch 29b (closed state, conduction state).

The electric power being fed from the noncontact feeding primary coil 32 to the noncontact power-receiving secondary coil 22 to charge the secondary battery 28 is extremely high in contrast to the electric power being utilized in the proximity noncontact communication between the proximity noncontact communication antenna 21 and the proximity noncontact communication external unit antenna 31. Therefore, the electric power of the harmonic wave produced by the noncontact power-receiving secondary coil 22 is relatively high. As a result, the influence on the proximity noncontact communication cannot be neglected, which may act as the factor that causes a malfunction in the proximity noncontact communicating function.

Therefore, as described above, because the conflict control is applied to the changeover switches 35a, 35b, 29a, 29b, an electric current never flows between the proximity noncontact communication antenna 21 and the proximity noncontact communication secondary controlling portion 23 while the electric power is fed from the noncontact feeding primary coil 32 to the noncontact power-receiving secondary coil 22. As a result, a malfunction never occurs in the proximity noncontact communicating function.

Further, according to this conflict control, an electric current never flows between the noncontact feeding primary coil 32 and the noncontact power-receiving secondary coil 22 during the proximity noncontact communication, and such a situation is never caused that the electric power that is to be utilized in the proximity noncontact communication is absorbed by the noncontact feeding primary coil 32 or the noncontact power-receiving secondary coil 22. As a result, the user can carry out the proximity noncontact communication more firmly.

In this manner, the proximity noncontact communication antenna and the noncontact charging coil are arranged in the electronic device 2A and the charger 3A in a superposed manner respectively. Therefore, an occupied area of them in the equipment main bodies respectively can be reduced, and a further size reduction of the electronic device 2A and the charger 3A can be attained. In the present embodiment, it is similar to above Embodiment 1 that the noncontact charging and the proximity noncontact communication are executed between the electronic device 2A and the charger 3A in a time-division system, and also the similar advantages can be achieved.

In the present embodiment, the preliminary charging of the secondary battery 28 is continued until the voltage Vp of the secondary battery 28 of the electronic device 2 (2A) exceeds a predetermined value Va. But this preliminary charging period may be decided on the basis of a time besides the voltage value. That is, a continuous charging as the preliminary charging may be executed until a predetermined time has elapsed.

Here, in the electronic device 2A, the proximity noncontact communication secondary controlling portion 23, the input signal deciding portion 24, the noncontact charging secondary controlling portion 25, the battery charging controlling portion 26, the remaining battery level detecting portion 27, and the conflict controlling portion 30 constitute a charging and communication controlling portion 39 that controls the charging and the proximity noncontact communication. Also, in the charger 3A, the controlling portion 33 of the proximity noncontact communication external unit, the noncontact charging primary controlling portion 34, and the conflict controlling portion 36 constitute a power-transmitting communication controlling portion 40 that controls the power feeding and the proximity noncontact communication.

The present invention is explained in detail with reference to the particular embodiments. But it is apparent for those skilled in the art that various variations and modifications can be applied without departing from a spirit and a scope of the present invention.

This application is based upon Japanese Patent Application (Japanese Patent Application No. 2008-091245) filed on Mar. 31, 2008; wherein the contents of which are incorporated herein by reference.

INDUSTRIAL APPLICABILITY

The present invention possesses such advantages that the electronic device can receive payment of the charge required for the charging even though the secondary battery of the electronic device ran into its overdischarge state and also can extricate itself from the overdischarge state, and is applicable to the electronic device charging system equipped with the electronic device such as the cellular phone, PHS, PDA, or the like, and the charger that gives a charge of electricity to this electronic device in a noncontact manner.

The invention claimed is:

1. An electronic device comprising:
   a power receiving coil configured to receive an electric power from a charger by electromagnetic induction;
   a secondary battery configured to be charged with the received electric power;
   an antenna configured to conduct a proximity noncontact communication with the charger; and
   a charging and communication controlling section configured to control the charging of the secondary battery and the proximity noncontact communication,
   wherein, if a voltage of the secondary battery is below a first value, the charging and communication controlling section controls a first charging of the secondary battery with the electric power received via the power receiving coil until the voltage of the secondary battery becomes the first value or more;
   wherein the proximity noncontact communication is conducted after the first charging is conducted; and
   wherein a second charging of the secondary battery is conducted until the voltage of the secondary battery becomes a second value larger than the first value after the proximity noncontact communication is conducted.

2. The electronic device according to claim 1, wherein the proximity noncontact communication is a communication regarding a payment of a charge.

3. The electronic device according to claim 1, wherein the antenna and the power receiving coil are arranged in a superposed state.

4. The electronic device according to claim 1, wherein the antenna is composed of a loop antenna, and a center of the loop antenna is set to coincide with a center of the power receiving coil.

5. The electronic device according to claim 4, wherein a part of a conductor of the loop antenna and a part of a conductor of the power transmitting coil are formed in common.

6. The electronic device according to claim 1, further comprising:
   a changeover switch connected to the antenna, and that switches between an electrical conduction state and a cutoff state to the antenna,
   wherein the charging and communication controlling section brings the changeover switch into the conduction state during the proximity noncontact communication, and brings the changeover switch into the cutoff state during the first charging or the second charging.

7. An electronic device that employs a secondary battery, which is rechargeable by a charger, as a power source and is capable of conducting a proximity noncontact communication with the charger, the electronic device comprising:
   a power receiving coil configured to receive electric power from the charger by electromagnetic induction;
   an antenna configured to conduct the proximity noncontact communication; and
   a charging and communication controlling section configured to control the charging and the proximity noncontact communication,
   wherein, if a voltage of the secondary battery is below a first value, the charging and communication controlling section: starts a first charging of the secondary battery with an electric power received via the power receiving coil, sends to the charger a notification indicating that a power transmission is to be stopped when a voltage of the secondary battery becomes a first value or more during the first charging, starts the proximity noncontact communication after the notification indicating that the power transmission is to be stopped is sent, and conducts a second charging of the secondary battery until the voltage of the second battery becomes a second value larger than the first value after the proximity noncontact communication is terminated.

8. A charger for charging an electronic device employing a secondary battery as a power source and for conducting a proximity noncontact communication with the electronic device, the charger comprising:

a power transmitting coil configured to transmit an electric power to the electronic device by electromagnetic induction;

an antenna configured to conduct the proximity noncontact communication; and a power transmission and communication controlling section configured to control a power transmission and the proximity noncontact communication, wherein the power transmission and communication controlling section: starts a first power transmission when the electronic device is detected in a standby state, stops the first power transmission when a notification indicating that the power transmission is to be stopped is received from the electronic device during the first power transmission, starts the proximity noncontact communication after the first power transmission is terminated, and starts a second power transmission when the proximity noncontact communication is terminated.

9. The charger according to claim 8, wherein the antenna and the power transmitting coil are arranged in a superposed state.

10. The charger according to claim 8, wherein the antenna is composed of a loop antenna, and a center of the loop antenna is set to coincide with a center of the power transmitting coil.

11. The charger according to claim 10, wherein a part of a conductor of the loop antenna and a part of a conductor of the power receiving coil are formed in common.

12. The charger according to claim 8, further comprising:

a changeover switch connected to the antenna, and that switches between an electrical conduction state and a cutoff state to the antenna, wherein the power transmission and communication controlling section brings the changeover switch into the conduction state during the proximity noncontact communication, and brings the changeover switch into the cutoff state during the first power transmission or the second power transmission.

13. The charger of claim 8, wherein the power transmission and communications controlling section is configured to control transmission and reception of the proximity noncontact communication.

14. An electronic device charging system, comprising:

the electronic device set forth in claim 1; and a charger configured to charge the electronic device employing a secondary battery as a power source and configured to conduct a proximity noncontact communication with the electronic device, the charger including:

a power transmitting coil that transmits an electric power to the electronic device by electromagnetic induction;

an antenna configured to conduct the proximity noncontact communication; and a power transmission and communication controlling section that controls a power transmission and the proximity noncontact communication, wherein the power transmission and communication controlling section: starts a first power transmission when the electronic device is detected in a standby state, stops the first power transmission when a notification indicating that the power transmission is to be stopped is received from the electronic device during the first power transmission, starts the proximity noncontact communication after the first power transmission is terminated, and starts a second power transmission when the proximity noncontact communication is terminated.

* * * * *